(12) United States Patent
Santiquet et al.

(10) Patent No.: US 12,037,790 B2
(45) Date of Patent: Jul. 16, 2024

(54) METHOD FOR DESIGNING A TYING BAR ENCLOSING A PLURALITY OF CONCRETE-REINFORCING BARS

(71) Applicant: Dassault Systemes, Velizy Villacoublay (FR)

(72) Inventors: Laurent Santiquet, Bouc-Bel-Air (FR); Jean-Philippe Flaux, Luynes (FR); Thomas Tripard, Aix-en-Provence (FR); Fabrice Caillaud, Palaiseau (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 1185 days.

(21) Appl. No.: 16/212,339

(22) Filed: Dec. 6, 2018

(65) Prior Publication Data

US 2019/0197197 A1 Jun. 27, 2019

(30) Foreign Application Priority Data

Dec. 22, 2017 (EP) ..................... 17306921

(51) Int. Cl.
*G06F 30/17* (2020.01)
*E04C 5/06* (2006.01)
(Continued)

(52) U.S. Cl.
CPC ............ *E04C 5/166* (2013.01); *E04C 5/0604* (2013.01); *G06F 30/00* (2020.01); *G06F 30/17* (2020.01); *G06F 2111/10* (2020.01)

(58) Field of Classification Search
CPC ..................................................... G06F 30/17
See application file for complete search history.

(56) References Cited

U.S. PATENT DOCUMENTS

2008/0238918 A1 10/2008 Culver et al.

FOREIGN PATENT DOCUMENTS

| JP | 06-248800 A | 9/1994 |
| JP | 2014-148814 A | 8/2014 |
| JP | 2017208018 A | * 11/2017 |

OTHER PUBLICATIONS

NHI Course No. 130126 Strut-and-Tie Modeling (STM) for Concrete Structure Oct. 2017 (Year: 2017).*

(Continued)

*Primary Examiner* — Rehana Perveen
*Assistant Examiner* — Cuong V Luu
(74) *Attorney, Agent, or Firm* — Hamilton, Brook, Smith & Reynolds, P.C.

(57) ABSTRACT

A computer-implemented method designs a tying bar enclosing a plurality of concrete-reinforcing bars in a 3D scene of a computer-aided design system. The method a) provides the three-dimensional models of the concrete-reinforcing bars to be enclosed by the tying bar; and b) computes a set of traces of each of the concrete-reinforcing bars. Each trace has a trace center. Next a set of connection lines is computed. Each connection line binds the trace centers. A set of circular arcs is computed. Each circular arc surrounds at least partially a respective trace, and a set of segments. Each segment is approximately parallel to a respective connection line and connects consecutive circular arcs. The segments and circular arcs form a center curve of the tying bar in the sketch plane. Lastly, the tying bar is designed based on the center curve and the bar radius of the tying bar.

2 Claims, 11 Drawing Sheets

(51) Int. Cl.
*E04C 5/16* (2006.01)
*G06F 30/00* (2020.01)
*G06F 111/10* (2020.01)

(56) References Cited

OTHER PUBLICATIONS

Anonymous "Stirrups around two bars, Tekla User Assistance," retrieved from the Internet: https://teklastructures.support.tekla.com/2017/en/ext_stirrups_around_two_bars, Jul. 21, 2017, [retrieved on May 17, 2018].

Anonymous, "Rebar—Wikipedia," retrieved from the Internet: https://en-wikipedia.org/w/index.oho?title=Rebar&oldid=812924379, Nov. 30, 2017 [retrieved on May 16, 2018].

Devillers, et al., "Incremental algorithms for finding the convex hulls of circles and the lower envelopes of parabolas," Retrieved from the Internet: https://www.sciencedirect.com/science/article/pii/002001909500132V/pdf?md5=f170236f4cfe5cf90aa8a037b525c97c&pid=I-s2.0-002001909500132V-main.pdf, Jun. 1, 1994, [retrieved on May 17, 2018].

European Search Report for European Application No. EP 17306921.2, titled: Method for Designing a Tying Bar Enclosing a Plurality of Concrete-Reinforcing Bars, Date of Completion of Search: Jun. 12, 2018.

\* cited by examiner

METHOD FOR DESIGNING A TYING BAR ENCLOSING A PLURALITY OF CONCRETE-REINFORCING BARS

RELATED APPLICATION(S)

This application claims priority under 35 U.S.C. § 119 or 365 to European Application No. 17306921.2, filed Dec. 22, 2017. The entire teachings of the above application(s) are incorporated herein by reference.

FIELD OF INVENTION

The invention relates to a method for designing a tying bar enclosing a plurality of concrete-reinforcing bars. It pertains to the field of CAD (Computer Aided Design), CAM (Computer Aided Manufacturing), and CAE (Computer Aided Engineering) applied to building and civil engineering, and more precisely to the design of concrete structure reinforced with steel bars.

BACKGROUND

Concrete is widely used as a construction material. It is very efficient to bear important compression loads but is weak to support traction that makes it crack. On the opposite, steel is efficient to support traction, but is less resistant for compression that makes it buckle. Hence, as of today, one of the best materials to bear high loads is the combination of concrete and steel that is called reinforced concrete. Reinforced concrete is made of concrete and steel rods (straight or bended) embedded inside it. Those steel rods are called "concrete-reinforcing bars" also known as "rebars". Longitudinal concrete-reinforcing bars enable concrete to support uniaxial tractions, but transverse "tying bars" binding together longitudinal bars are also necessary to bear shear efforts. Tying bars in the form of stirrup, lacing and frames are commonly used as tying bars. A lacing LA, as illustrated by FIG. 1, is a steel bar which is bent into a "C" shape and which is installed and fixed transversely to the longitudinal direction of two parallel concrete-reinforcing bars ($RB_1$, $RB_2$). A stirrup ST, as illustrated by FIG. 2, is a steel bar which loops entirely around two concrete-reinforcing bars ($RB_1$, $RB_2$). A tying bar which loops entirely around more than two parallel but non-coplanar concrete-reinforcing bars ($RB_1$, $RB_2$, $RB_3$, $RB_4$) is also known as a frame, as illustrated by FIG. 3A. Several layers of tying bars can be placed at proper intervals on a beam of concrete-reinforcing bars to prevent them from buckling. FIG. 3B illustrates the layout of a reinforcing structure comprising several layers of frames ($FR_1$, $FR_2$, ... $FR_N$) according to FIG. 3A.

When designing concrete-reinforcing bars assemblies using computer aided design (CAD), computer aided manufacturing (CAM), and computer aided engineering (CAE) applications, the layout of a concrete-reinforcing bars assembly, and the layout of the tying bars which strap the concrete-reinforcing bars, can be simulated. In some of the existing solutions, the user can choose the layout of the tying bar among a predefined limited list of situations. However, it may be desirable to simulate the real contact of concrete-reinforcing bars with the tying bar on a given layer. The diameter of each of the concrete-reinforcing bars may also not be necessarily the same from one concrete-reinforcing bar to the other. Thus the bending of the tying bar has to be adapted to the diameter of each of the concrete-reinforcing bar. Such an adaptation is not performed in the existing solutions. Finally, in some configurations, the tying bar can fold on itself, and in that case, the bar must be shifted so that it does not clash with itself. The shift of the tying bar has to be done anyway for a stirrup or for a frame, in order to close loop of the tying bar. The dimensions, shapes and number of stirrups and frames also depend on the dimensions of the assembly of concrete-reinforcing bars, and on the number of concrete-reinforcing bars. Thus, in some cases, stirrups or frames with several loops (multiple-legged stirrups or multiple-legged frames) are used to enclose, with different loops, several concrete-reinforcing bars.

SUMMARY

A goal of the invention is then to provide a computer-implemented method for designing a tying bar which takes the physical dimensions and layout of the concrete-reinforcing bars into account, which can be applied on several layers of a beam of concrete-reinforcing bars, and which manages the folding of the tying bar on itself.

An object of the present invention is then a computer-implemented method for designing a tying bar enclosing a plurality of concrete-reinforcing bars in a 3D scene of a computer-aided design system, the method comprising the steps of:

a) Providing the three-dimensional models of the concrete-reinforcing bars to be enclosed by the tying bar with a predefined bending radius according to a predefined sequence, said tying bar having a bar radius;

b) Computing a set of traces of each of the concrete-reinforcing bars in a transverse sketch plane of the 3D scene, each trace having a trace center;

c) Computing a set of connection lines, each connection line binding the trace centers according to the predefined sequence;

d) Computing a set of circular arcs, each circular arc surrounding at least partially a respective trace in the sketch plane, and a set of segments, each segment being approximately parallel to a respective connection lines and connecting consecutive circular arcs according to the predefined sequence, said segments and said circular arcs forming a center curve of the tying bar in the sketch plane;

e) Designing the tying bar based on the center curve and the bar radius of the tying bar.

According to particular embodiments of the invention:

step d) of computing a set of circular arcs may further comprise sub-steps of:

d1) Computing a proximal point, said proximal point being positioned at one intersection of the trace with the bisectrix of a preceding connection line and a subsequent connection line according to the predefined sequence;

d2) Computing a distal point, said distal point being located on the perpendicular line to the tangent to the trace at the proximal point, and being spaced apart from the proximal point by the bar radius of the tying bar;

d3) Computing an arc center, said arc center being located on the perpendicular line to the tangent to the trace at the proximal point, and being spaced apart from the distal point by the bending radius;

d4) Computing at least a start point and/or an end point of the circular arc by performing a rotation, by a predefined angle, of the distal point around the normal to the sketch plane passing by the arc center.

step d4) of computing at least a start point and/or an end point may further comprise the performing of a constraint resolution in order to ensure a maximum tangency of the circular arc with the segments connected to the circular arc according to the predefined sequence.

for a subset traces which is located after a self-intersection point of a first connection line and a second connection line according to the predefined sequence, the step of computing a set of segments and a set of circular arcs may be performed in an angularly shifted sketch plane.

the angularly shifted sketch plane may be the result of the rotation of the sketch plane by a rotation angle around the axis of the segment preceding the second connection line, said rotation angle being computed so as to prevent the crossing of segments of the center curve.

the rotation angle may be computed based on the inverse tangent of the division of the bar radius by the distance between the axis of the segment preceding the self-intersection point and a contact point projection of the self-intersection point on the segment corresponding to the first connection line.

the contact point projection may be positioned on the segment corresponding to the first connection line at a distance which is function of the position of the self-intersection point between both trace centers of the first connection line.

Another object of the invention is a method of manufacturing an assembly of at least two concrete-reinforcing bars and at least a tying bar having a bar radius, the tying bar being configured to enclose said concrete-reinforcing bars with a predefined bending radius, the method comprising the steps of:

Positioning said concrete-reinforcing bars according to a given layout;
Designing said tying bar by a method as defined above;
Physically manufacturing said assembly, including enclosing said concrete-reinforcing bars with said tying bar.

Another object of the invention is an assembly of at least two concrete-reinforcing bars and at least a tying bar obtained by the method of manufacturing as defined above.

Another object of the invention is a computer program product, stored on a non-transitory computer-readable data-storage medium, comprising computer-executable instructions to cause a computer system to carry out a method as defined above.

Another object of the invention is a non-transitory computer-readable data-storage medium containing computer-executable instructions to cause a computer system to carry out a method as defined above.

Another object of the invention is a computer system comprising a processor coupled to a memory and a graphical user interface, the memory storing computer-executable instructions to cause the computer system to carry out a method as defined above.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

The invention will be better understood with the help of some embodiments described by way of non-limiting examples and illustrated by the accompanying drawings wherein.

DETAILED DESCRIPTION

A description of example embodiments follows.

Hereafter, a three-dimensional model is an object—or a digital model thereof—allowing a three-dimensional representation, which allows the viewing of the parts from all angles.

Hereafter, a three-dimensional (or 3D) scene is a virtual environment, which is constituted by a plurality of 3D objects disposed in a three-dimensional space.

Hereafter, a center curve refers to a curve representation of the 3D model of an object. For an object which is longitudinally extended, each point of the center curve is computed with the center of gravity of the object in its transverse section. In particular, the center curve of a 3D model of a right circular cylinder is a curve binding all the circle centers which are computed in the transverse section.

Hereafter, a sketch plane refers to a plane which contains at least one portion of the center curve, including at least one bend.

Hereafter, a construction line is a geometric element which is not part of the final result but is just a temporary element used for computing.

Figure 1:
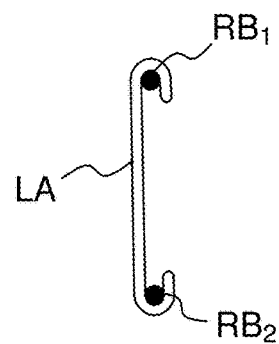
FIGS. 1 to 3B illustrate different types of tying bars.
Figure 2:
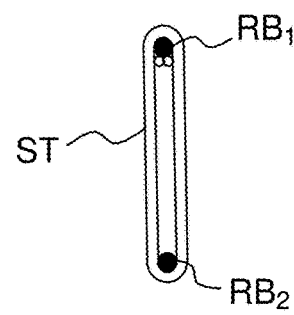
Figure 3A:
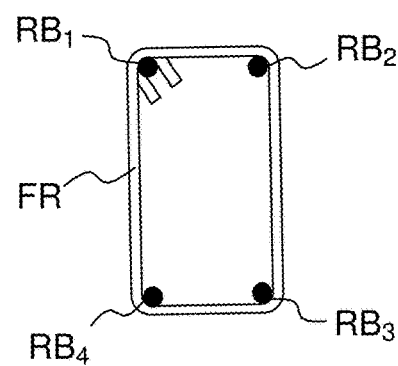
Figure 3B:
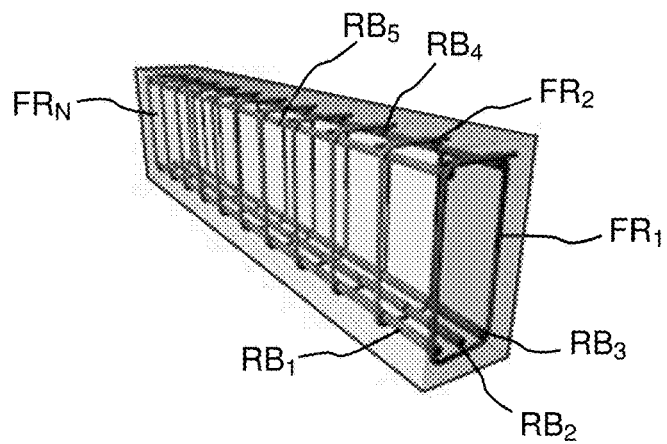
Figure 4:
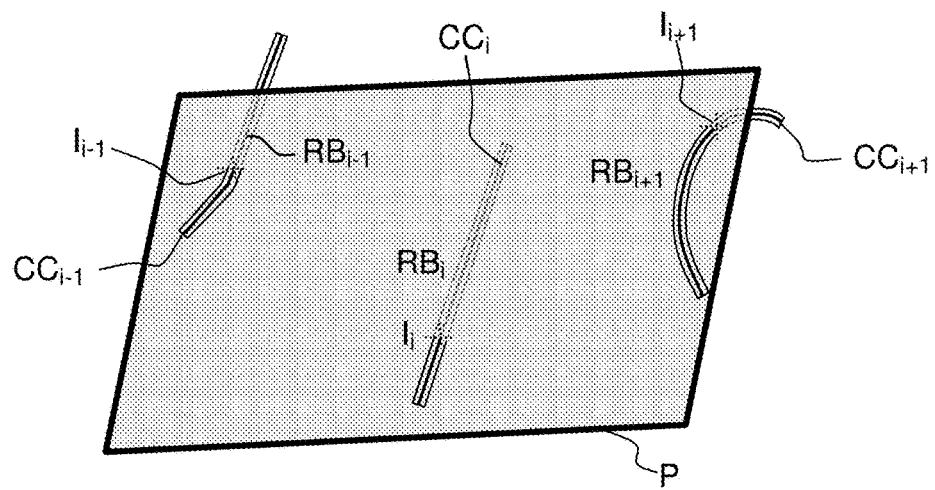
FIGS. 4 to 16 illustrate different steps of the construction of a tying bar.

In FIG. 4, three consecutive 3D modeled concrete-reinforcing bars ($RB_{i-1}$, $RB_i$, $RB_{i+1}$), among a set of N concrete-reinforcing bars, are provided. The intersections points of the concrete-reinforcing bars ($RB_{i-1}$, $RB_i$, $RB_{i+1}$) with a sketch plane P are computed. The sketch plane P is constructed from a point taken on $RB_i$ and from the vector which is tangent to the curve $RB_i$ at this point. The sketch plane P passes through this point and the normal to the plane is this tangent vector. Each concrete-reinforcing bar ($RB_{i-1}$, $RB_i$, $RB_{i+1}$) is characterized by its center curve ($CC_{i-1}$, $CC_i$, $CC_{i+1}$), which can be stored in the data model of a computer system, and also by its radius ($r_{i-1}$, $r_i$, $r_{i+1}$). Instead of performing an intersection of a 2D plane (the sketch plane) with a 3D-volume (the concrete-reinforcing bars), an intersection between a 2D plane (the sketch plane) with a 1D curve (the center curve) is performed, which is much faster in terms of computation speed. From this set of intersection points ($I_{i-1}$, $I_i$, $I_{i+1}$), the circles or ellipses which would have resulted from the intersection of the plane with the bars have to be built.

Figure 5:
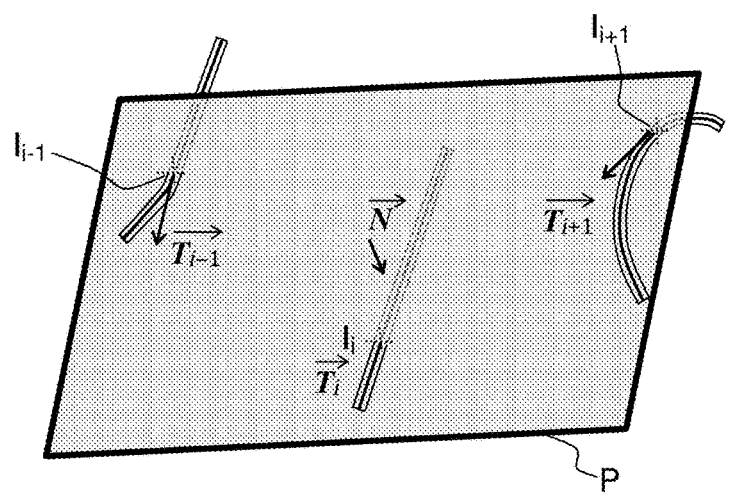
Figure 6A:
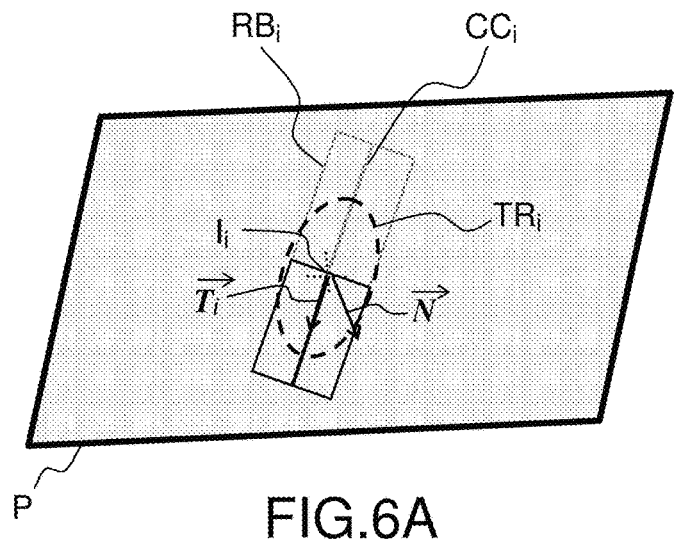
Figure 6B:
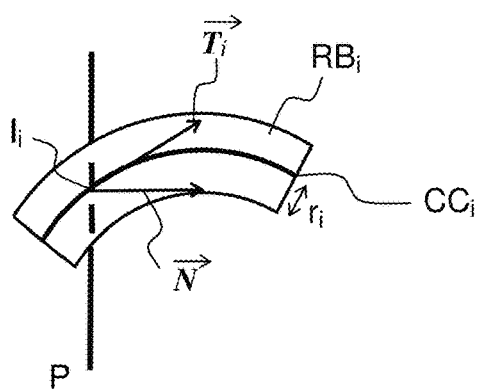

FIG. 5 illustrates the tangent vectors ($T_{z-1}$, $T_z$, $T_{z+1}$) of all the center curves ($CC_{i-1}$, $CC_i$, $CC_{i+1}$) at intersection points ($I_{i-1}$, $I_i$, $I_{i+1}$), and the normal vector N of the sketch plane P. FIG. 6A illustrates particularly, on the sketch plane P, the tangent vector T of one center curve $CC_i$ at intersection point $I_i$, and the normal vector N of the sketch plane P. These elements are also illustrated in FIG. 6B, in a perpendicular view of the sketch plane P. If the tangent vector $T_z$ is parallel to the normal vector N, a circle of center $I_i$ and radius $r_i$ is created. Otherwise (i.e. if the tangent vector $T_z$ is not parallel to the normal vector N, and not parallel to the sketch plane P), an ellipse of center $I_i$ is created. The minor radius of the ellipse is equal to ri, and its major radius is equal to $r_i/\cos(\text{angle }(T_z, N))$, wherein angle $(T_z, N)$ is the angle between the tangent vector $T_z$ and the normal vector N.

Figure 7:
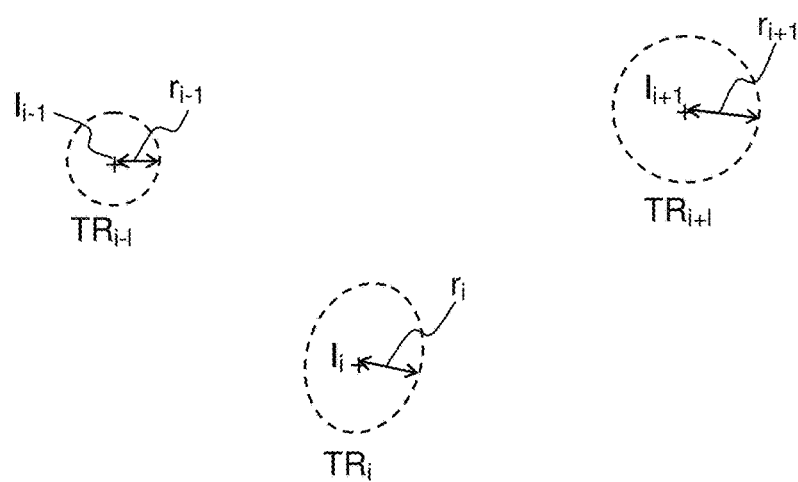

The circles and ellipses corresponding to the different concrete-reinforcing bars ($RB_{i-1}$, $RB_i$, $RB_{i+1}$) on the sketch plane P are illustrated in FIG. 7. These circles and ellipses are designated as traces ($TR_{i-1}$, $TR_i$, $TR_{i+1}$). By construction, each intersection point ($I_{i-1}$, $I_i$, $I_{i+1}$) is a trace center.

Figure 8:
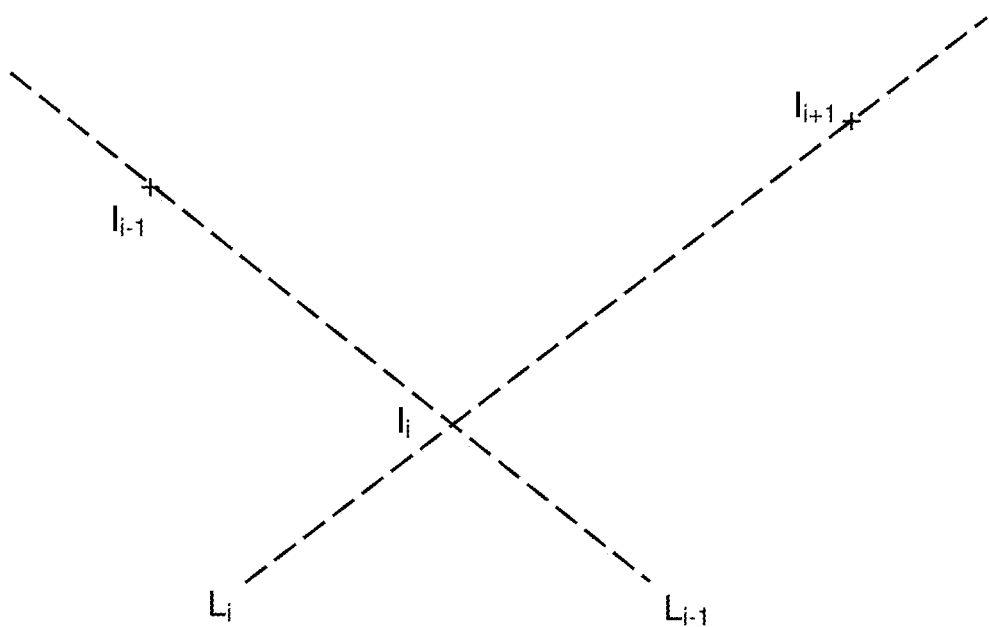

FIG. 8 illustrates the trace centers ($I_{i-1}$, $I_i$, $I_{i+1}$) which have been computed previously. The enclosing of the concrete-reinforcing bars ($RB_{i-1}$, $RB_i$, $RB_{i+1}$) is performed according to a predefined sequence. The predefined sequence corresponds to the sequence of strapping of the concrete-reinforcing bars ($RB_{i-1}$, $RB_i$, $RB_{i+1}$). It can be input by a user of the computer-aided design system. It can alternatively be suggested by the computer-aided design system. Starting from the predefined sequence, a set of connection lines ($L_{i-1}$, $L_i$, $L_{i+1}$) is computed. Each connection line ($L_{i-1}$, $L_i$, $L_{i+1}$) binds two consecutive trace centers (Ii−1, Ii, Ii+1).

For each trace ($TR_{i-1}$, $TR_i$, $TR_{i+1}$), a circular arc ($C_{i-1}$, $C_i$, $C_{i+1}$), which surrounds at least partially a respective trace ($TR_{i-1}$, $TR_i$, $TR_{i+1}$) in the sketch plane P, is computed. The center curve of the tying bar in the sketch plane comprises the set of circular arcs ($C_{i-1}$, $C_i$, $C_{i+1}$). Each circular arc ($C_i$) is computed based on a proximal point ($M_i$), which is positioned on its corresponding trace ($TR_i$).

Figure 9A:
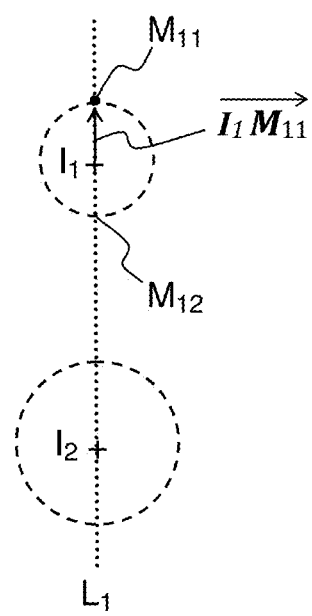
Figure 9B:
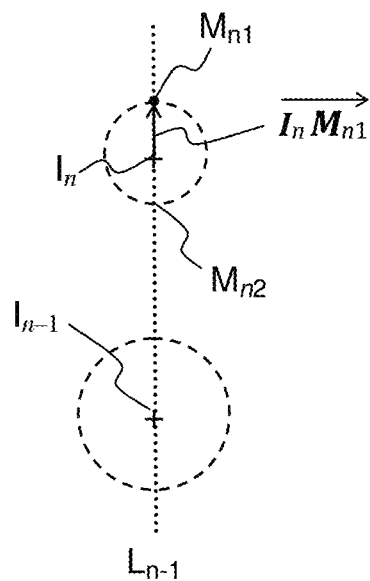

FIGS. 9A and 9B respectively illustrate the construction of the proximal point ($M_1$) of the first concrete-reinforcing bar $RB_1$ to tie and the construction of the proximal point ($M_n$) of the last concrete-reinforcing bar $RB_n$ to tie. For the first concrete-reinforcing bar $RB_1$ to tie, illustrated by FIG. 9A, a first $M_{11}$ and a second $M_{12}$ intermediate points are computed. The intermediate points ($M_{11}$, $M_{12}$) are the intersections of the first trace $TR_1$ with the first connection lines $L_1$. It is reminded that the first connection lines $L_1$ connects the first $I_1$ and the second $I_2$ trace centers. The connection vector $I_2I_1$ has the second trace center $I_2$ as origin and the distance between the second trace center $I_2$ and the first trace center $I_1$ as norm. The vectors are schematically illustrated in the figures: in particular, the arrows representing the norms of the vectors are reduced, for the sake of clarity of the drawings. The first direction vector $I_1M_{11}$ has the first trace center $I_1$ as origin and the distance between the first trace center $I_1$ and the first intermediate point $M_{11}$ as norm. The second direction vector $I_1M_{12}$ has the first trace center $I_1$ as origin and the distance between the first trace center $I_1$ and the second intermediate point $M_{12}$ as norm. The intermediate point for which the scalar product of the corresponding direction vector ($I_1M_{11}$, $I_1M_{12}$) with the connection vector $I_2I_1$ is positive is considered as the proximal point M1 of the first concrete-reinforcing bar $RB_1$. The same applies to the computing of the proximal point $M_n$ of the last concrete-reinforcing bar $RB_n$, with the first $M_{n1}$, and a second $M_{n2}$ intermediate points, and with the connection vector $I_{n-1}I_n$.

Figure 10:
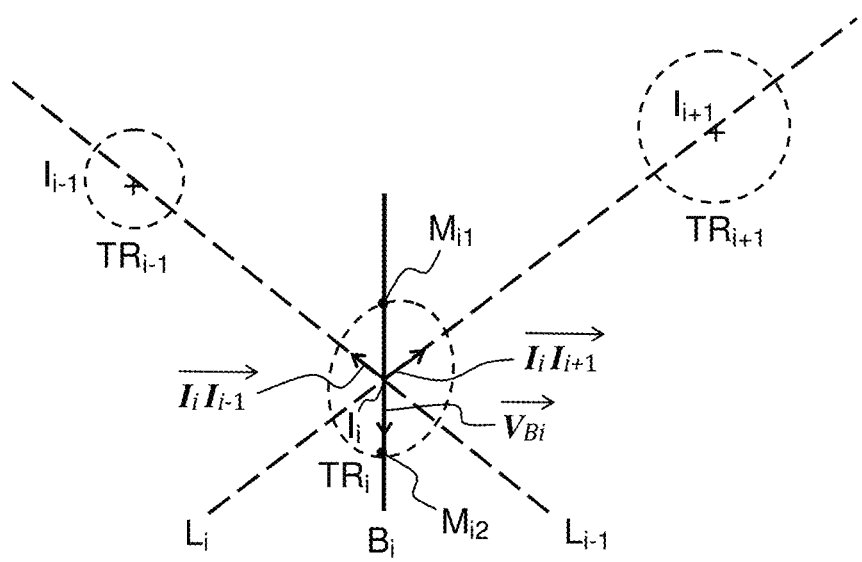
Figure 11:
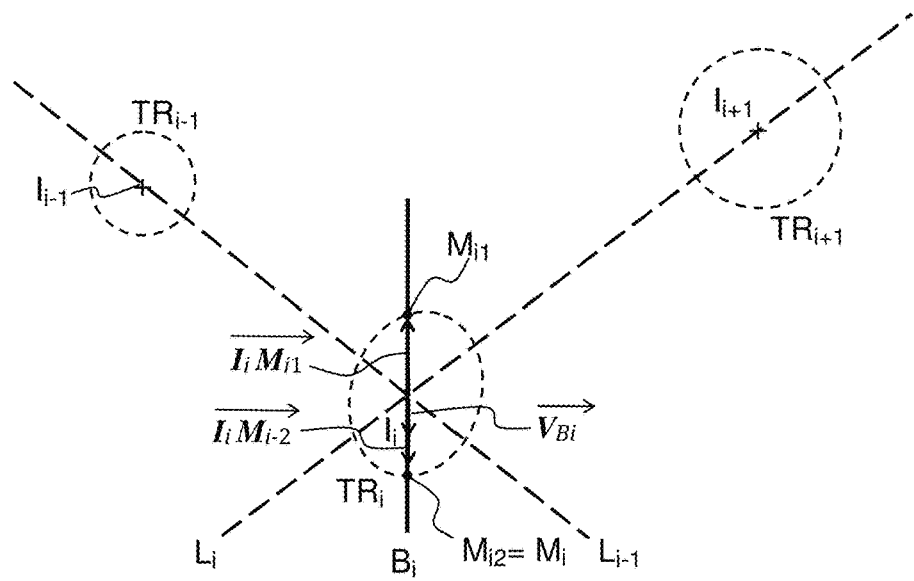

FIGS. 10 and 11 illustrate the determination of the proximal point $M_i$ of a concrete-reinforcing bar $RB_i$ which is neither the first nor the last according to the predefined sequence. It is reminded that the connection lines ($L_{i-1}$, $L_i$) intersect in trace center Ii of the trace $TR_i$. The bisectrix $B_i$ of the connection lines ($L_{i-1}$, $L_i$) is computed. Two intermediate proximal points ($M_{i1}$, $M_{i2}$) result from the intersection of the bisectrix $B_i$ with the trace $TR_i$. A first intermediate vector $I_iI_{i-1}$ is defined. The first intermediate vector $I_iI_{i-1}$ has the trace center $I_i$ as origin and the distance between the trace center $I_i$ and the preceding trace center $I_{i-1}$ as norm. A second intermediate vector $I_iI_{i+1}$ is defined. The second intermediate vector $I_iI_{i+1}$ has the trace center Ii as origin and the distance between the trace center $I_i$ and the subsequent trace center $I_{i+1}$ as norm. A connection vector $V_{Bz}$ is then defined:

$$V_{Bz} = -(I_iI_{i-1} + I_iI_{i+1})$$

A first direction vector $I_iM_{i1}$ is defined. It has the trace center $I_i$ as origin and the distance between the trace center $I_i$ and the first intermediate point $M_{i1}$ as norm. A second direction vector $I_iM_{i2}$ is defined. It has the trace center $I_i$ as origin and the distance between the trace center $I_i$ and the second intermediate point $M_{i2}$ as norm. The intermediate point for which the scalar product of the corresponding direction vector ($I_iM_{i1}$, $I_iM_{i2}$) with the connection vector $V_{Bz}$ is positive is considered as the proximal point $M_i$ of the corresponding concrete-reinforcing bar $RB_i$.

Figure 12:
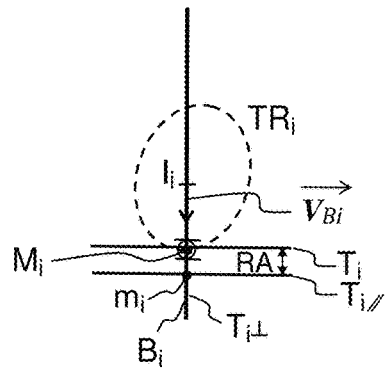
Figure 13:
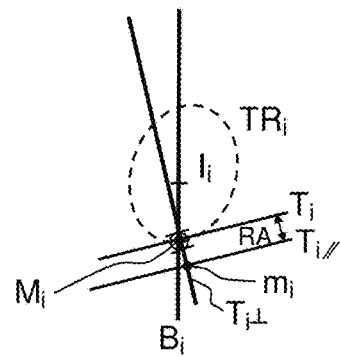

Therefore, for each trace $TR_i$, a proximal point $M_i$ is computed. FIGS. 12 and 13 illustrate the computing of a distal point $m_i$. FIG. 12 illustrates the initialization step of the computing of a distal point $m_i$. A first construction line $T_i$ is perpendicular to the bisectrix $B_i$ and passes through the proximal point $M_i$. A second construction line $T_{i//}$ is parallel to the first construction line $T_i$, and is distant from the bar radius RA of the tying bar to the first construction line $T_i$. A third construction line $T_i^\perp$ is perpendicular to the first construction line $T_i$ and passes through the proximal point $M_i$. The distal point $m_i$ is then constructed, based on the initialization step, and on the following constraints:

The trace $TR_i$, the bisectrix $B_i$ and the proximal point $M_i$ are fixed;

The first construction line $T_i$ is tangent to the trace $TR_i$;

The first construction line $T_i$ is coincident to the trace $TR_i$ in the proximal point $M_i$;

The second construction line $T_{i//}$ is parallel to the first construction line $T_i$;

The second construction line $T_{i//}$ is distant from the bar radius RA of the tying bar to the first construction line $T_i$;

The third construction line $T_i^\perp$ is perpendicular to the first construction line $T_i$;

The distal point $m_i$ is coincident to the second construction line $T_{i//}$ and to the third construction line $T_i^\perp$.

A constraints resolution is then launched considering the geometries of the initialization step and the constraints previously listed. FIG. 13 illustrates the result of the constraints resolution. The computed final position of distal point mi insures that the tying bar will be tangent to the trace $TR_i$ in the proximal point $M_i$.

The constraints resolution is solved by a constraint-solver, which is a set of software algorithms that solve systems of non-linear algebraic equations. The solver inputs are the aforementioned geometries of the initialization step, and the aforementioned constraints. In this case, an update of the geometries can be performed: the constraint-solver moves the distal point mi to satisfy all the constraints.

Figure 14:
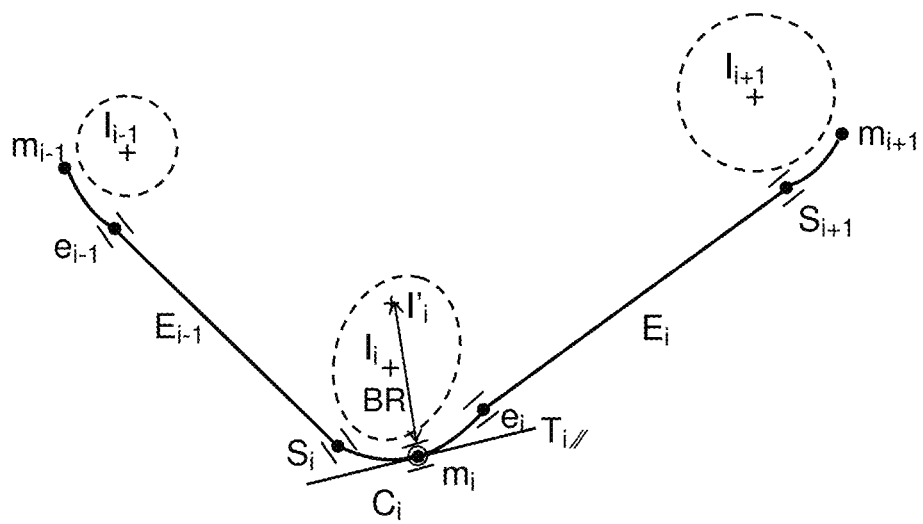
Figure 15:
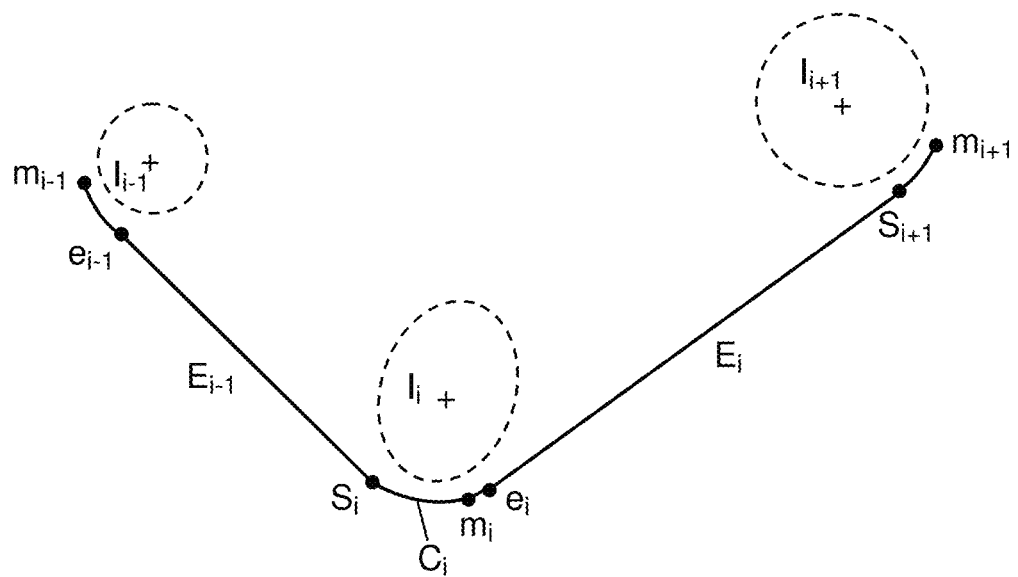

FIGS. 14 and 15 illustrate the computing of a set of circular arcs $C_i$ and a set of segments $E_i$. Each circular arc $C_i$ surrounds at least partially a respective trace $TR_i$ in the sketch plane P and passes through the distal point $m_i$ of the corresponding trace $TR_i$. Each segment $E_i$ is approximately parallel to a corresponding connection lines $L_i$, and connects consecutive circular arcs $C_i$. FIG. 14 illustrates the initialization step of the computing of the set of circular arcs $C_i$ and the set of segments $E_i$. For each trace $TR_i$, an arc center $I'_i$ is defined. It is located on the perpendicular line $T_i^\perp$ to the tangent $T_i$ to the trace $TR_i$, at the proximal point $M_i$. The arc center $I'_i$ is spaced apart from the distal point $m_i$ by the bending radius $BR_i$ of the concrete-reinforcing bar $RB_i$. The value of the bending radius $BR_i$ of each of the concrete-reinforcing bar $RB_i$ can be input by the user. Alternatively, default values can be suggested to the user, and optionally modified by the user. In the initialization step, start point $s_i$ and an end point $e_i$ are computed for trace $TR_i$. These points result from the rotation, by a predefined angle, of the distal point $m_i$ around the normal to the sketch plane P passing by the arc center $I'_i$. $C_i$ is therefore, by construction, an arc of a circle whose center is the arc center $I'_i$ and whose radius is the bending radius $BR_i$. According to an embodiment, the predefined angle can have the same absolute value for the start point $s_i$ and for the end point $e_i$. The predefined angle can be negative for the start point $s_i$, and positive for the end point $e_i$. According to an embodiment, the predefined angle can be $-\pi/4$ for the start point $s_i$, and $\pi/4$ for the end point $e_i$, but other values can be selected. If the tying bar has no loop (for example a lacing), only one point among the end point and the start point is computed for the first trace $TR_1$ and for the last trace $TR_n$. A set of segments $E_i$ is constructed, according to the predefined sequence of the tying bar. Each segment $E_i$ is a line which binds the end point $e_i$ of a former trace $TR_{i-1}$ to the start point $s_i$ of its corresponding trace $TR_i$, according to the predefined sequence.

The localization of the start point $s_i$ and the end point $e_i$ are consolidated, based on the initialization step, and on the following constraints:

The constraints defined at the step of constructing the distal point $m_i$ are still set;

The circular arc $C_i$ is coincident to the second construction line $T_{i//}$ in the distal point $m_i$;

The circular arc $C_i$ is tangent to the second construction line $T_{i//}$;

The radius of the circular arc $C_i$ is fixed to BR;

The segment $E_i$ and the circular arc $C_i$ are tangent in the end point $e_i$;

The segment $E_{i-1}$, of the preceding trace $TR_{i-1}$ and the circular arc $C_i$ are tangent in the start point $s_i$.

Then the constraints resolution is executed to give the final result curve respecting the geometries of the initialization step and the constraints previously listed. With this modelization, the start point $s_i$ and for the end point $e_i$ roll on circular arc $C_i$ to adjust the position of the segments $E_i$. FIG. 15 illustrates the result of the constraints resolution. The center curve of the tying bar is composed of the segments $E_i$ and the circular arc $C_i$ of all the traces $TR_i$, after the constraints resolution.

The constraints resolution is solved by a constraint-solver. The solver inputs are the aforementioned geometries of the initialization step, and the aforementioned constraints. In this case, an update of the geometries can be performed: the constraint-solver moves the localizations of the start point $s_i$ and the end point $e_i$ to satisfy all the constraints.

Figure 16:
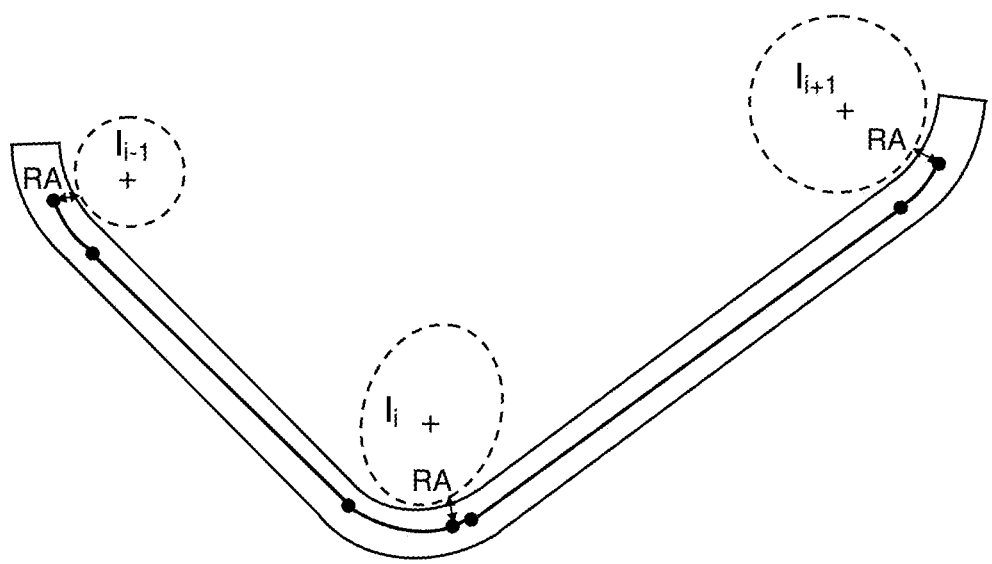

The tying bar is then constructed, based on the center curve and the radius of the tying bar RA, as illustrated by FIG. 16.

Figure 17:
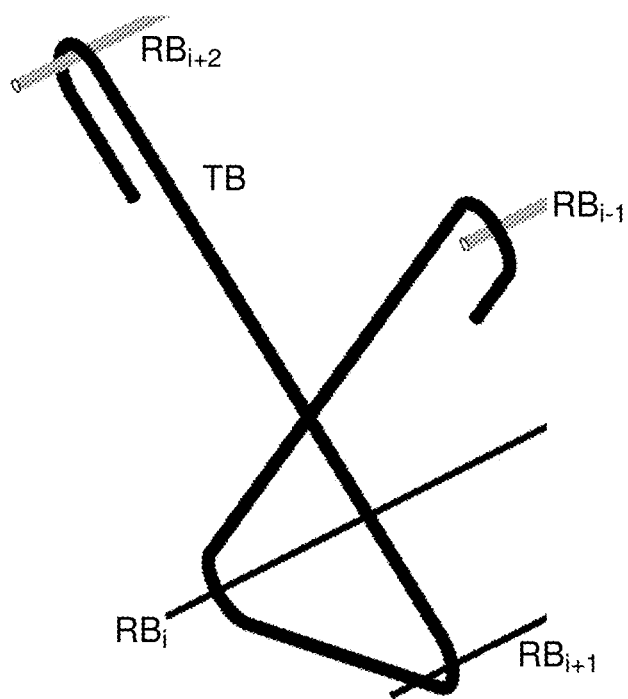
FIGS. 17 to 21 illustrate the management of a self-intersection during the construction of the tying bar.

FIGS. 17 to 21 illustrate the case of a self-intersection of the tying bar TB. In FIG. 17, the tying bar TB straps a first concrete-reinforcing bar $RB_{i-1}$, a second concrete-reinforcing bar $RB_i$, a third concrete-reinforcing bar $RB_{i+1}$ and a fourth concrete-reinforcing bar $RB_{i-2}$, according to that sequence. In such a case, the tying bar TB is folding on itself, and an angular shift must be introduced during the process, in order to simulate as truly as possible the physical tying bar. This angular shift is introduced by computing a new plane. The goal is to create a plane to continue the sketch so that the fold of the bar leads to a contact point in the area where the self-intersection is dodged. The position and the value of the shift are automatically computed but they can be easily exposed to the end user to give more flexibility and parameterization of the design.

Figure 18:
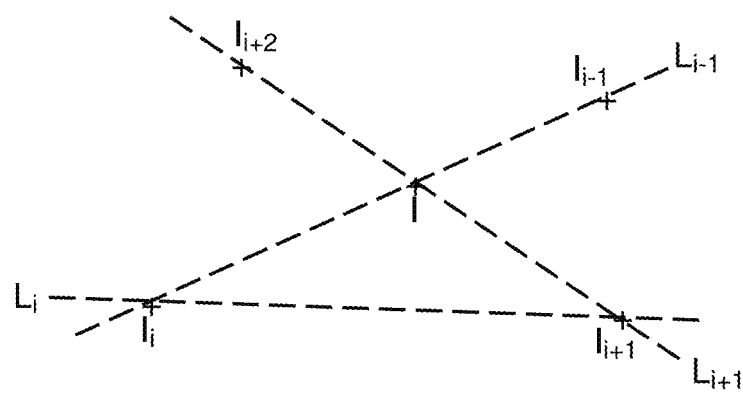

A self-intersection is detected when non-immediately consecutive connection lines Li intersect. As illustrated by FIG. 18, connection lines $L_{i-1}$ and $L_{i+1}$ intersect at a self-intersection point (I). If such a self-intersection is found, the construction of the tying bar is stopped in the current sketch plane P just before this intersection. In the example illustrated by FIG. 18, the tying bar is constructed until (and including) the segment $E_i$ corresponding to the connection lines $L_i$.

Figure 19:
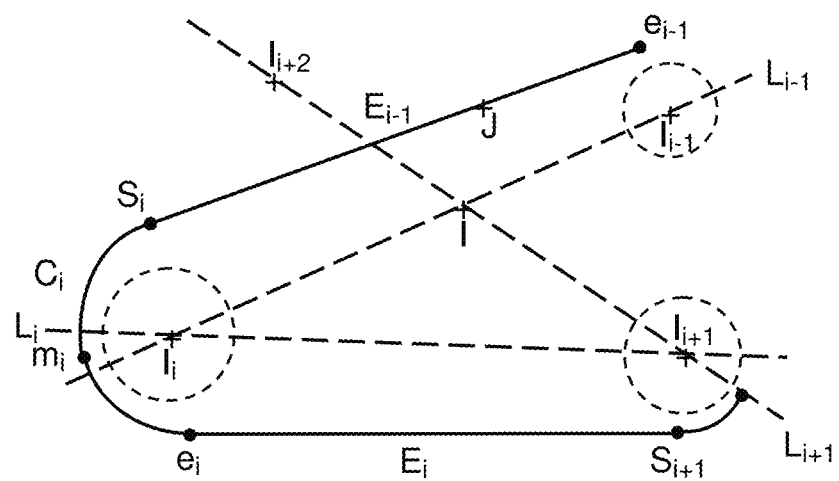

As illustrated by FIG. 19, a contact point projection J is computed using a distance ratio obtained from the intersection of the self-intersecting connection lines ($L_{i-1}$, $L_{i+1}$). The distance ratio DR is equal to:

$$DR=[I_{i-1},I]/[I_{i-1},I_i]$$

wherein $[I_{i-1}, I]$ is the distance between the trace center $I_{i-1}$ and the self-intersection point I, and $[I_{i-1}, I_i]$ is the distance between the trace center $I_{i-1}$ and the trace center $I_i$.

Consequently, the distance ration DR is applied to the penultimate segment $E_{i-1}$ before the segment to be constructed on the angularly shifted plane. Therefore, the contact point projection J is positioned on the penultimate segment $E_{i-1}$, at a distance from the end point $e_i$ in accordance with the distance ratio DR:

$$[e_{i-1},J]=DR*[e_{i-1},s_i]$$

Figure 20:
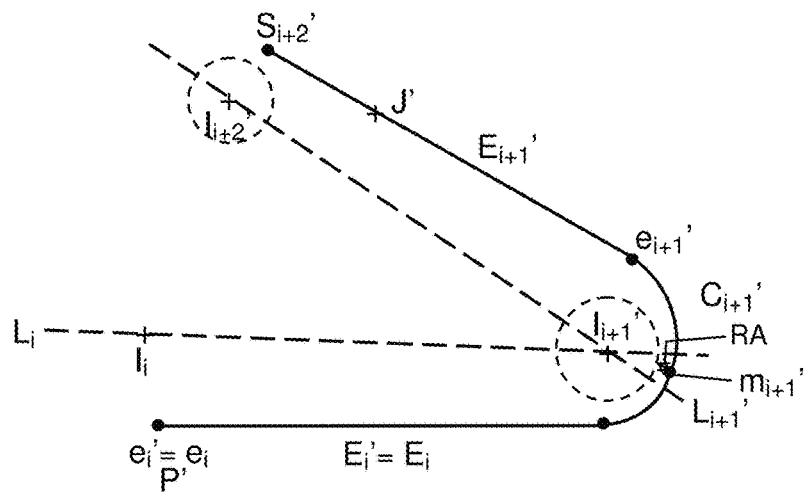
Figure 21:
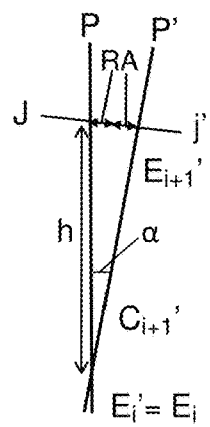

FIGS. 20 and 21 illustrate the construction of the angularly shifted sketch plane P', based on the contact point projection J. FIG. 20 represents the view of the angularly shifted sketch plane P', and FIG. 21 represents the sketch plane P and the angularly shifted sketch plane P' in a perpendicular view. The angularly shifted sketch plane P' is the result of the rotation of the sketch plane P by a rotation angle $\alpha$ around the axis of the segment $E_i$ preceding the segment to be constructed on the angularly shifted plane. The rotation angle $\alpha$ is computed according to the formula:

$$\alpha=2*\text{Arctan}(RA/h),$$

wherein Arctan is the inverse tangent function, RA is the radius of the tying bar, and h is the distance between the contact point projection J and last segment $E_i$ of the sketch plane P, which is also the first segment $E_i'$ of the angularly shifted sketch plane P'.

The proximal point $M_{i+1}'$, the distal point $m_{i+1}'$, the start point $s_{i+1}'$ and the end point $e_{i+1}'$ corresponding to the last circular arc $C_{i+1}'$ before the self-intersection are computed in the angularly shifted sketch plane P'. These points are computed the same manner as in the sketch plane P. The contact point J', which is an estimation of the self-intersection point of the tying bar in the angularly shifted sketch plane P', is determined through the rotation by the angle $\alpha$ of the contact point projection J around the axis of the segment $E_i'$. The estimated computation can be refined by using an optimization algorithm which consists in finding the best angle that minimizes the gap where the tying bar is self-intersecting.

If there is a self-intersection which is detected in the angularly shifted sketch plane P', another angularly shifted sketch plane P'' is computed the same way.

The center curve of the final tying bar is made by concatenating all the pieces of geometry resulting of the different solvings of configurations in the different planes.

This center curve can then be dressed-up with standard tools to build the extension, hooks and volumic shape of the bar.

Figure 22:
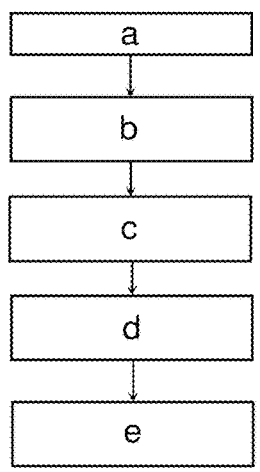
FIGS. 22 and 23 illustrate the different steps of a method according to the invention.

FIG. 22 illustrates schematically the aforementioned main steps of the method. In particular, in step a), the three-dimensional models of the concrete-reinforcing bars are provided. In step b), the traces of each of the concrete-reinforcing bars are computed. In step c) the connection lines binding the trace centers are computed. In step d), the circular arcs tangent to their respective traces are computed, as well as the segments binding the circulars arcs. In step e), the tying bar is computed based on the center curve and the bar radius of the tying bar.

Figure 23:
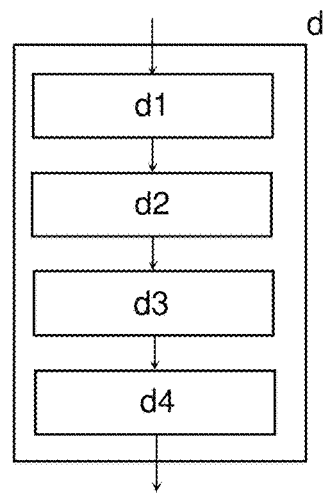

FIG. 23 illustrates schematically the afore-mentioned main sub-steps set of step d) of computing of the circular arcs. In particular, in sub-step d1), a proximal point is computed for each trace. In sub-step d2), a distal point is computed for each trace. In sub-step d3), an arc center is computed, and in sub-step d4), a start point and/or an end point are determined.

The method can be applied to any configuration of strapping of concrete-reinforcing bars, and to several kinds of layout, such as frames, stirrups, and lacings. It is a "physical" solution in the meaning that it models the real contact of the concrete-reinforcing bars.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 24:
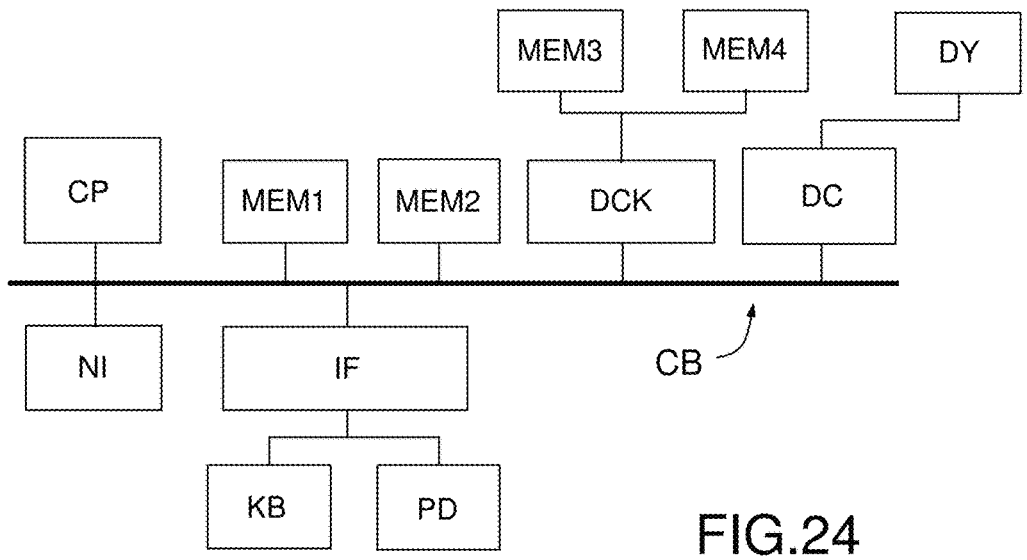
FIGS. 24 and 25 illustrate block diagrams of respective computer systems suitable for carrying out a method according to different embodiments of the invention.

A computer suitable for carrying out a method according to an exemplary embodiment of the present invention is described with reference to FIG. 24. In FIG. 24, the computer includes a Central Processing Unit (CPU) CP which performs the method step described above while running an executable program, i.e. a set of computer-readable instructions, stored in a memory device such as RAM MEM1 or ROM MEM2 or hard disk drive (HDD) MEM3, DVD/CD drive MEM4, or stored remotely. Moreover, one or more computer files defining the concrete-reinforcing bars may also be stored on one or more of memory devices MEM1 to MEM4, or remotely.

The claimed invention is not limited by the form of the computer-readable media on which the computer-readable instructions of the inventive process are stored. For example, the instructions and files can be stored on CDs, DVDs, in FLASH memory, RAM, ROM, PROM, EPROM, EEPROM, hard disk or any other information processing device with which the computer communicates, such as a server or computer. The program can be stored on a same memory device or on different memory devices.

Further, a computer program suitable for carrying out the inventive method can be provided as a utility application, background daemon, or component of an operating system, or combination thereof, executing in conjunction with CPU CP and an operating system such as Microsoft VISTA, Microsoft Windows 8, UNIX, Solaris, LINUX, Apple MAC-OS and other systems known to those skilled in the art.

CPU CP can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize.

Further, the CPU can be implemented as multiple processors cooperatively working to perform the computer-readable instructions of the inventive processes described above.

The computer in FIG. 24 also includes a network interface NI, such as an Intel Ethernet PRO network interface card from Intel Corporation of America, for interfacing with a network, such as a local area network (LAN), wide area network (WAN), the Internet and the like. The computer further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard, the sensitive surface for the touch mode and the pointing device, together with the display controller and the I/O interfaces, form a graphical user interface, used by the user to provide input commands—e.g. to move the pointer—and by the computer for displaying the three-dimensional scene and the graphical tool.

Disk controller DKC connects HDD MEM3 and DVD/CD MEM4 with communication bus CBS, which can be an ISA, EISA, VESA, PCI, or similar, for interconnecting all of the components of the computer.

A description of the general features and functionality of the display, keyboard, pointing device, as well as the display controller, disk controller, network interface and I/O interface is omitted herein for brevity as these features are known.

Figure 25:
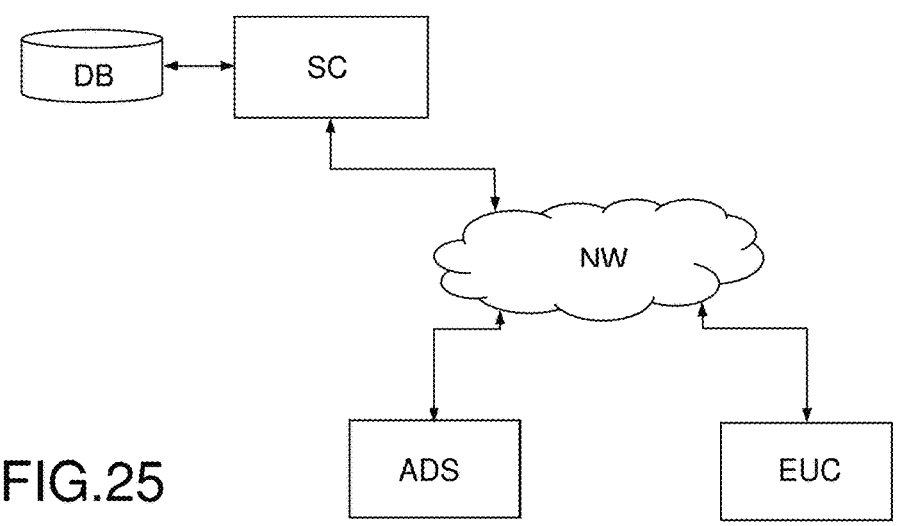

FIG. 25 is a block diagram of a computer system suitable for carrying out a method according to a different exemplary embodiment of the present invention.

In FIG. 25, the executable program EXP and the computer files defining the concrete-reinforcing bars are stored on memory devices connected to a server SC. The memory devices and the overall architecture of the server may be the same as discussed above with reference to FIG. 24, except that display controller, sensitive surface, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 24, except that the memory devices of the administrator system and the end user computer do not store the executable program EXP and/or the computer files defining the concrete-reinforcing bars. However, the end user computer does store a client program designed for cooperating with the executable program of the server, as it will be discussed below.

As can be appreciated, the network NW can be a public network, such as the Internet, or a private network such as an LAN or WAN 10 network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses, via the network NW, a database DB stored by the server SC and containing files defining the concrete-reinforcing bars. The server performs the processing as described above, and transmits to the end user computer a file corresponding to the desired representation of the scene including the concrete-reinforcing bars and the tying bar, again using the network NW.

Although only one administrator system ADS and one end user system EUX are shown, the system can support any number of administrator systems and/or end user systems without limitation. Similarly, multiple servers can also be implemented in the system without departing from the scope of the present invention.

Any method steps described herein should be understood as representing modules, segments, or portions of code which include one or more executable instructions for implementing specific logical functions or scope of the exemplary embodiment of the present invention.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

The invention claimed is:

1. A method of manufacturing an assembly of at least two concrete-reinforcing bars and at least a tying bar having a bar radius (RA), the tying bar being configured to enclose said concrete-reinforcing bars with a predefined bending radius ($BR_i$), the method comprising the steps of:

Positioning said concrete-reinforcing bars according to a given layout;

Designing said tying bar by:

a) Providing three-dimensional models of the concrete-reinforcing bars to be enclosed by the tying bar with a predefined bending radius ($BR_i$) according to a predefined sequence, said tying bar having a bar radius (RA);

b) Computing a set of traces ($TR_i$) of each of the concrete-reinforcing bars in a transverse sketch plane (P) of a 3D scene of a computer-aided design system, each trace ($TR_i$) having a trace center ($I_i$);

c) Computing a set of connection lines ($L_i$), each connection line ($L_i$) binding the trace centers ($I_i$) according to the predefined sequence;

d) Computing a set of circular arcs ($C_i$), each circular arc ($C_i$) surrounding at least partially a respective trace ($TR_i$) in the sketch plane (P), and computing a set of segments ($E_i$), each segment ($E_i$) corresponding to a respective connection line ($L_i$) and connecting consecutive circular arcs ($C_i$) according to the predefined sequence, said segments ($E_i$) and said circular arcs ($C_i$) forming a center curve of the tying bar in the sketch plane (P); and e) Designing the tying bar in the 3D scene based on the center curve and the bar radius (RA) of the tying bar; and Physically manufacturing said assembly, including enclosing said concrete-reinforcing bars with said tying bar.

2. An assembly of at least two concrete-reinforcing bars and at least a tying bar obtained by the method of manufacturing according to claim 1.

* * * * *